Dec. 6, 1927.

F. L. MORSE

DRIVE CHAIN

Filed Dec. 1, 1925    2 Sheets-Sheet 1

Inventor
Frank L. Morse
By his Attorneys

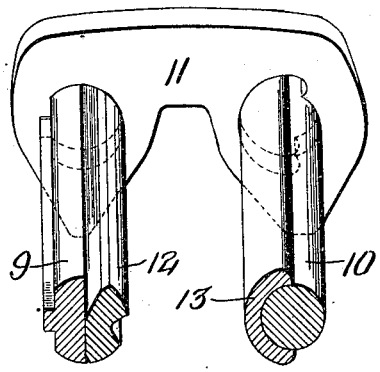
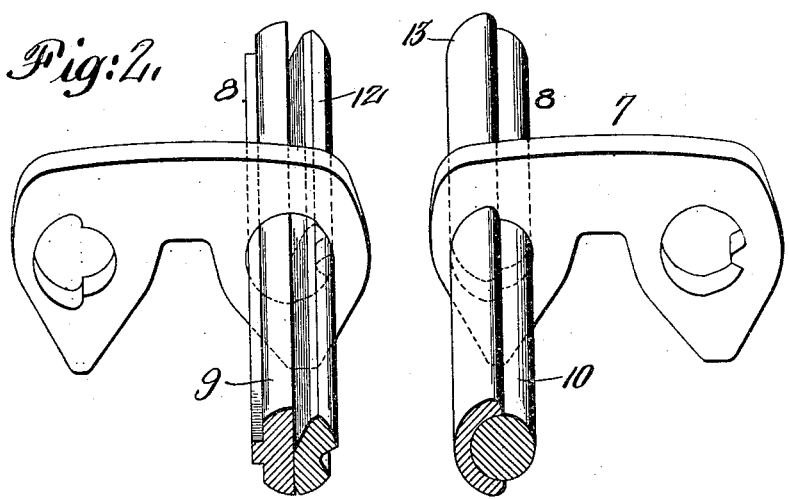
Fig. 2.
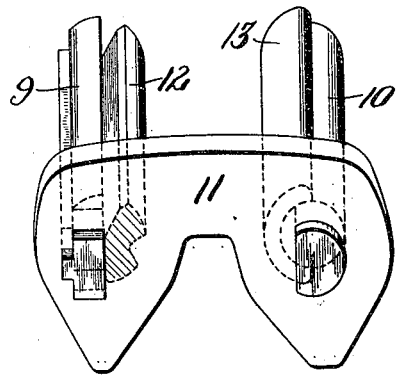

Patented Dec. 6, 1927.

1,651,832

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

DRIVE CHAIN.

Application filed December 1, 1925. Serial No. 72,434.

This invention relates to an improvement in drive chains, and particularly to the arrangement of the joints.

The primary object of the invention is to provide a simple form of drive chain embodying and combining certain advantages of other types of chain drives, as will be pointed out more particularly hereinafter.

I propose to minimize the whipping action in drive chains caused by periodic impulses on the chain, which action often becomes violent, consequently making the drive noisy and setting up objectionable vibrations. This I accomplish by employing joints, the friction of some of which is appreciably greater than that of the others by virtue of which the vibrations are broken up, and this because the chain will vibrate at the point having the least friction, and as the joints of lesser friction may be introduced at every other joint, or at irregular intervals spaced throughout the length of chain, the period of vibration will not be uniform, and hence the vibrations will be broken up.

How the foregoing, together with such other objects and advantages as may hereinafter appear, or are incident to my invention, are realized, is illustrated in preferred form in the accompanying drawings, wherein—

Fig. 2 is a tilted plan view with portions of the pintles broken out, and with the plates in their order of assembling.

Figure 1:
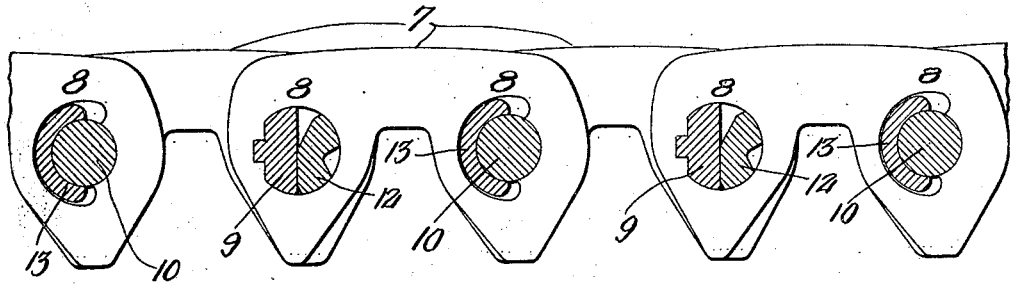
Fig. 1 is a longitudinal section through a multiplate chain constructed in accordance with my invention.
Figures 3, 4:
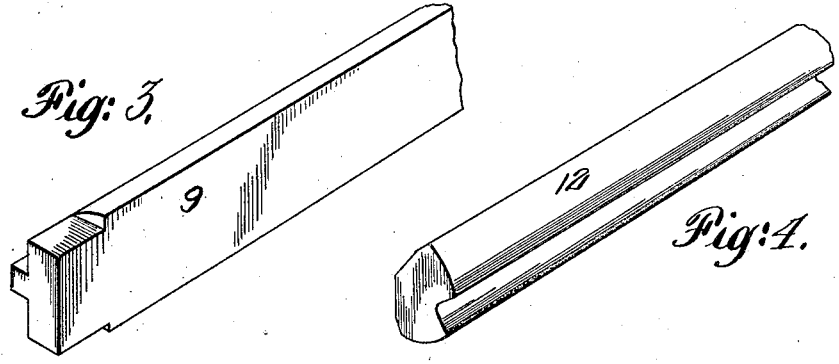
Figs. 3 and 4 are fragmentary perspective views of the pintle parts of the rocker joints.
Figures 5, 6:
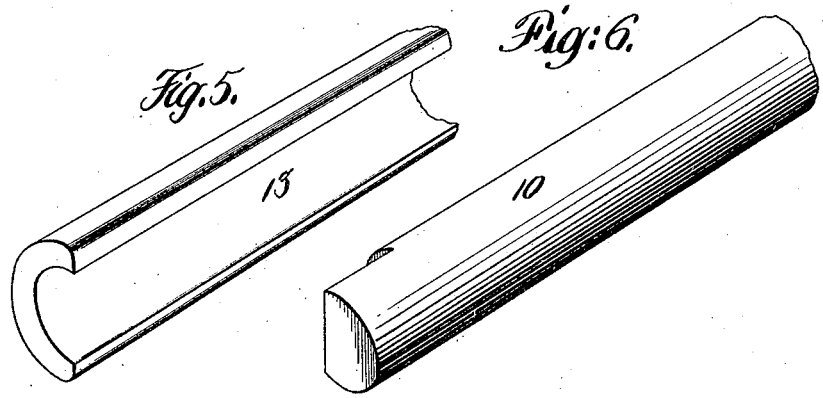
Figs. 5 and 6 are fragmentary perspective views of the pintle parts of the bush joints.

Referring to Figs. 1 and 2, it will be seen that I have shown a mulitplate drive chain comprising the links 7 composed of a plurality of plates, and connected together by joints or pintles 8 composed of a series of two-part rocker joints, alternating with a series of pin and bush joints. The seat pins 9 of the rocker joints and the pins 10 of the pin and bush joints are fixed in the outside end plates 11 of the chain, and may be secured therein in any suitable manner to prevent lateral displacement. The plates forming one link of the chain are fixed to move with the seat pins 9 and pins 10, and the adjacent plates forming the adjacent links are fixed to move with the rockers 12 and the bushings 13.

It is pointed out that in contradistinction to the ordinary practice of employing like pintles for all the joints of the chain, I employ some of one type and the balance of another type. In the drawings, I have shown these types as the rocker joint type and the bush type, the former having appreciably less friction than the latter. It will, therefore, be seen that as the friction of one joint is more than the other, there will be a tendency for any vibration setting up in operation to flex the chain at the joint having the least friction. Owing to the fact that joints having greater friction are interposed between those having less friction, the vibrations are broken up, this preventing a building up of vibrations to the point where the chain will whip.

While I have described my invention in connection with multiplate chains, it is to be understood that it may be used in connection with other types of chain, where the advantages to be derived therefrom are desirable.

The number of joints of greater friction employed may be varied, according to the particular service to which the chain is to be put.

What I claim is:—

1. In a drive chain, the combination of friction joints and anti-friction joints alternately arranged.

2. In a drive chain, the combination of joints, the friction of some of which is greater than the friction of the remainder, whereby to minimize vibration of the chain.

3. In a drive chain, the combination of rocker joints and bush joints, said bush joints being arranged at intervals along the length of chain.

4. A drive chain having joints certain of which are practically frictionless, and others of which have appreciable friction whereby to minimize vibration of the chain.

In testimony whereof, I have hereunto signed my name.

FRANK L. MORSE.